United States Patent
Guzowski

[11] Patent Number: 6,044,539
[45] Date of Patent: Apr. 4, 2000

[54] PIPE GASKET AND METHOD OF INSTALLATION

[75] Inventor: Samuel Guzowski, Appartado, Costa Rica

[73] Assignee: S & B Technical Products, Inc., Fort Worth, Tex.

[21] Appl. No.: 09/054,198

[22] Filed: Apr. 2, 1998

[51] Int. Cl.[7] .................................................. B23P 19/00
[52] U.S. Cl. .......................... 29/453; 29/235; 29/451; 277/609
[58] Field of Search .............................. 29/450, 451, 453, 29/525, 235; 277/314, 609; 285/344; 138/109

[56] References Cited

U.S. PATENT DOCUMENTS

| | | | |
|---|---|---|---|
| 3,173,266 | 3/1965 | Shutt | 29/453 |
| 3,326,580 | 6/1967 | Munier et al. | 29/451 |
| 3,327,379 | 6/1967 | Clements | 29/235 |
| 3,389,923 | 6/1968 | Love, Jr. et al. | 29/453 |
| 3,447,819 | 6/1969 | Borsum et al. | 277/609 |
| 3,573,873 | 4/1971 | Pearson | 277/609 |
| 3,740,821 | 6/1973 | Von Bredow | 29/453 |
| 3,775,832 | 12/1973 | Werra | 29/450 |
| 4,030,872 | 6/1977 | Parmann | 42/393 |
| 4,050,722 | 9/1977 | Berger et al. | 29/453 |
| 4,147,368 | 4/1979 | Baker et al. | 277/609 |
| 4,285,478 | 8/1981 | Stamboulian | 29/453 |
| 4,336,014 | 6/1982 | Parmann | 29/450 |
| 4,368,894 | 1/1983 | Parmann | 29/453 |
| 4,610,834 | 9/1986 | Baron et al. | 29/235 |
| 4,905,366 | 3/1990 | Warner | 29/451 |
| 5,143,381 | 9/1992 | Temple | 277/609 |

*Primary Examiner*—S. Thomas Hughes
*Assistant Examiner*—Trinh T. Nguyen
*Attorney, Agent, or Firm*—Charles D. Gunter, Jr.

[57] ABSTRACT

A method is shown for installing a pipe gasket within the bell end of a pipe section. The bell end is oriented along a horizontal work axis. The annular gasket is inserted within the mouth opening of the bell end of the pipe. The gasket is oriented at an oblique angle with respect to the horizontal axis, whereby a leading edge of the annular gasket moves past the annular groove provided in the bell end and a trailing edge of the gasket engages the annular groove. A retracting force is exerted on the gasket by pulling the leading edge backwards in the direction of the mouth opening of the bell end of the pipe until the gasket snaps into a lock-in position within the annular groove. The gasket body has an embedded relatively rigid ring which is precisely located to ensure that the gasket, once in snap-fit position, is securely retained within the gasket groove and cannot be displaced.

19 Claims, 6 Drawing Sheets

PIPE GASKET AND METHOD OF INSTALLATION

BACKGROUND OF THE INVENTION

1. Field of the Invention

The present invention relates generally to sealing gaskets used for pipe joints in which a male spigot pipe section is installed within a mating female socket pipe section and, more specifically, to an improved gasket and installation method for installing a locked-in gasket within a preformed gasket groove in a section of pipe used to form a pipe joint.

2. Description of the Prior Art

Pipes formed from thermoplastic materials including polyethylene, polypropylene and polyvinyl chloride are used in a variety of industries. In forming a joint between sections of pipe, the spigot or male pipe end is inserted within the female or socket pipe end. An annular, elastomeric ring or gasket is typically seated within a groove formed in the socket end of the thermoplastic pipe. As the spigot is inserted within the socket, the gasket provides the major seal capacity for the joint. It is critical, during the installation process, that the gasket not be able to twist or flip since a displaced or dislocated gasket will adversely affect the ultimate sealing capacity of the joint.

One early attempt to ensure the integrity of pipe joints used under demanding conditions was to provide local reinforcement of the groove portion of the female socket end by means of a heavier wall thickness in this region of the pipe. In some cases, reinforcing sleeves were also utilized. Each of these solutions was less than ideal, in some cases failing to provide the needed joint integrity and often contributing to the complexity and expense of the manufacturing operation.

In the early 1970's, a new technology was developed by Rieber & Son of Bergen, Norway, referred to in the industry as the "Rieber Joint." The Rieber system employed a combined mould element and sealing ring for sealing a joint between the socket end and spigot end of two cooperating pipes formed from thermoplastic materials. In the Rieber process, an elastomeric gasket was installed within an internal groove in the socket end of the female pipe as the female or belling end was simultaneously being formed. Rather than utilizing a preformed groove, the Rieber process provided a prestressed and anchored elastomeric gasket during the belling operation. Because the pipe groove was, in a sense, formed around the gasket, the gasket was securely retained in position and did not tend to twist or flip or otherwise allow impurities to enter the sealing zones of the joint, thus increasing the reliability of the joint and decreasing the risk of leaks or possible failure due to abrasion. The Rieber process is described in the following issued United States patents, among others: U.S. Pat. Nos. 4,120,521; 4,061,459; 4,030,872; 3,965,715; 3,929,958; 3,887,992; 3,884,612; and 3,776,682.

The Rieber system, with its integrally installed gasket provided a "compression" seal geometry, rather than relying upon the lip seal systems of the prior art. As the female socket end of the pipe cooled around the previously installed gasket, the elastomeric body of the gasket was compressed between a steel reinforcing ring and the groove formed in the socket end of the pipe. When the mating spigot was installed to make up a pipe joint, further compression of the gasket occurred in a radial direction along an internal compression region of the gasket.

Despite the advances offered by the Rieber process, the belling operation was somewhat complicated and costly. Also, certain situations exist in which it would be desirable to install a gasket within a preformed groove in the selected pipe end, rather than utilizing an integrally installed gasket in which the groove in the pipe is formed around the gasket.

In the prior art joints utilizing preformed grooves, gaskets were often provided in two parts. The main gasket body was formed of an elastomeric material and typically featured an internal groove or recess. A hardened band, formed of rigid plastic or metal, was installed within the groove. While such retaining bands helped to resist axial forces acting on the gasket during assembly of the joint, the band could become displaced or twisted during the insertion operation.

The present invention has, as one object, to provide an improved pipe gasket for use in pipe joints which offers the advantage of a Rieber type locked-in seal while allowing the gasket to be installed in a preformed groove.

Another object of the invention is to provide an improved gasket which is securely retained within a preformed pipe groove without the necessity of a separate retaining band.

Another object of the invention is to provide an improved method of installing a reinforced gasket within a preformed pipe groove.

Another object of the invention is to provide an improved gasket installation method which is simpler and less costly than existing installation techniques.

Another object of the invention is to provide a method for installing a gasket having a known external diameter within the mouth opening of a bell end of a pipe section where the external diameter of the gasket exceeds the internal diameter of the mouth opening.

SUMMARY OF THE INVENTION

A method is shown for installing a gasket within a gasket receiving groove provided within the bell end of a pipe section. The bell end has a mouth opening which is engageable with a spigot end of a mating pipe section to form a pipe joint. The pipe section having the bell end is first oriented along a horizontal work axis. An annular gasket is then inserted within the mouth opening of the bell end. The annular gasket is oriented at an oblique angle with respect to the horizontal work axis, whereby a leading edge of the annular gasket moves past the annular groove provided in the bell end. A retracting force is then exerted on the annular gasket by pulling the leading edge thereof backwards in the direction of the mouth opening of the bell end until the gasket snaps into a locked-in position within the annular groove.

Preferably, the annular gasket has a body formed of a flexible elastomeric material and has a relatively rigid ring which is located at an embedded location which circumscribes the gasket body. Preferably, the relatively rigid ring is made of steel and is generally round in cross-section. The relatively rigid ring has an internal diameter which defines a locus of points which is equal to or greater than the internal diameter of the remainder of the bell end of the pipe which joins the annular groove. The relatively rigid ring tends to resist axial forces tending to displace the gasket from the annular groove when in position within the groove.

An improved pipe section is also shown. The pipe section includes a length of thermoplastic pipe and has a bell pipe end. The bell pipe end has a mouth opening which is engageable with a spigot end of a mating pipe section to form a pipe joint. A preformed annular groove is located within the mouth opening of the bell pipe end. A sealing gasket is located within the preformed annular groove provided within the bell end of the pipe section. The sealing gasket is retained within the annular groove in a snap-fit fashion. The annular gasket has a body formed of a flexible elastomeric material with a relatively rigid ring located at an embedded location which circumscribes the gasket body. The embedded location of the ring is precisely determined to allow the gasket to be obliquely inserted within the bell end of the pipe and subsequently snap-fitted into position, whereby the gasket is securely retained in a locked-in position within the preformed groove in the pipe belled end.

Additional objects, features and advantages will be apparent in the written description which follows.

DETAILED DESCRIPTION OF THE INVENTION

Figure 1:
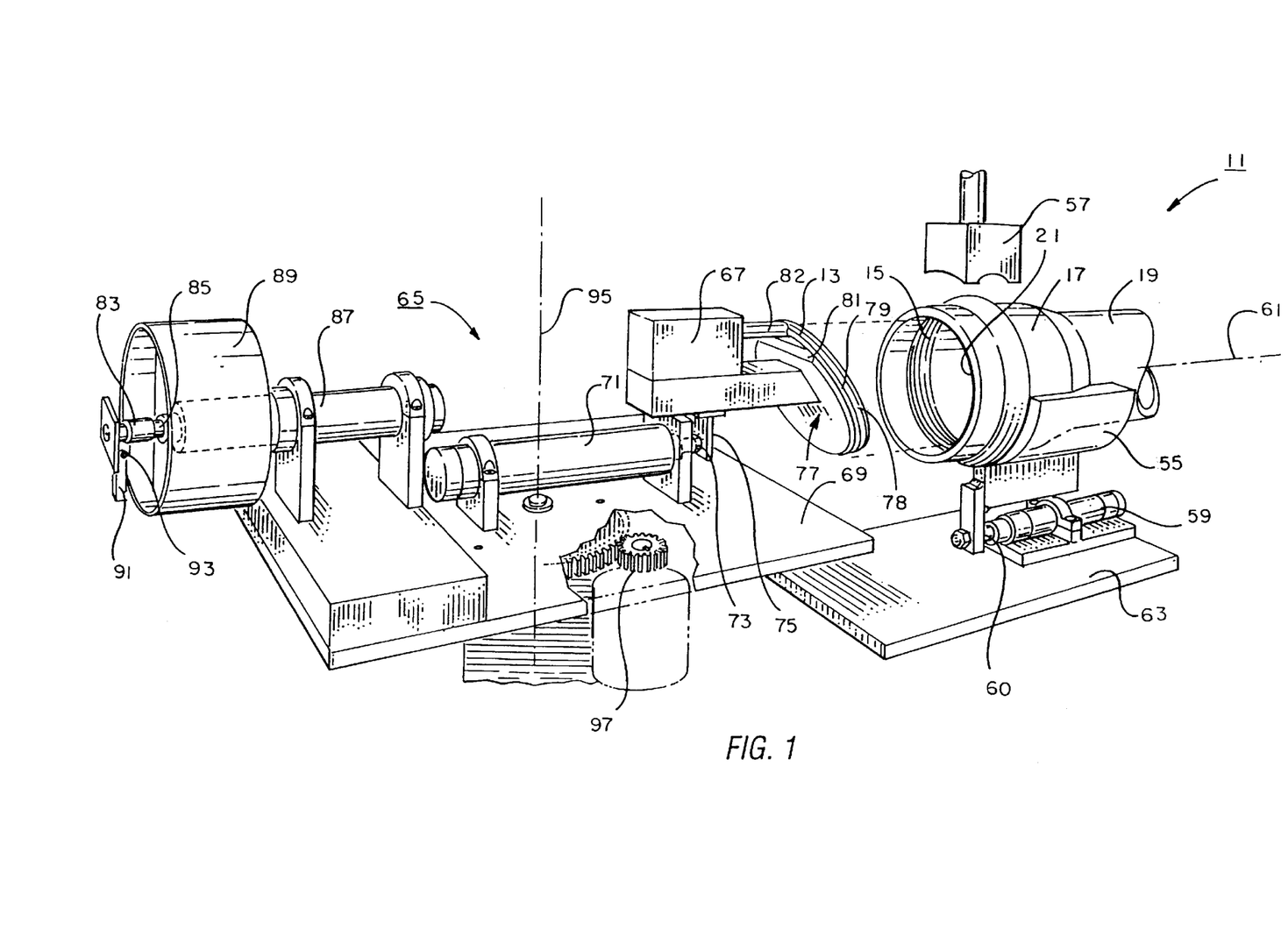
FIG. 1 is an isometric view of the apparatus used to install the gasket of the invention within the bell end of a thermoplastic pipe section.

FIG. 1 shows an apparatus used in the method of the invention designated generally as 11. The apparatus 11 is used to install a gasket 13 within a gasket receiving groove 15 provided within the bell end 17 of a section of thermoplastic pipe 19. The pipe section 19 can be formed of any of a variety of commercially available thermoplastic materials, such as the polyolefin family including polyethylene and polypropylene as well as polyvinyl chloride and similar materials. Thermoplastic pipes of this general type are used in a variety of industrial settings including water, sewage and chemical industries. The bell end 17 of the thermoplastic pipe section has a mouth opening 21 which is engageable with a spigot end (not shown) of a mating pipe section to form a pipe joint.

Figure 7:
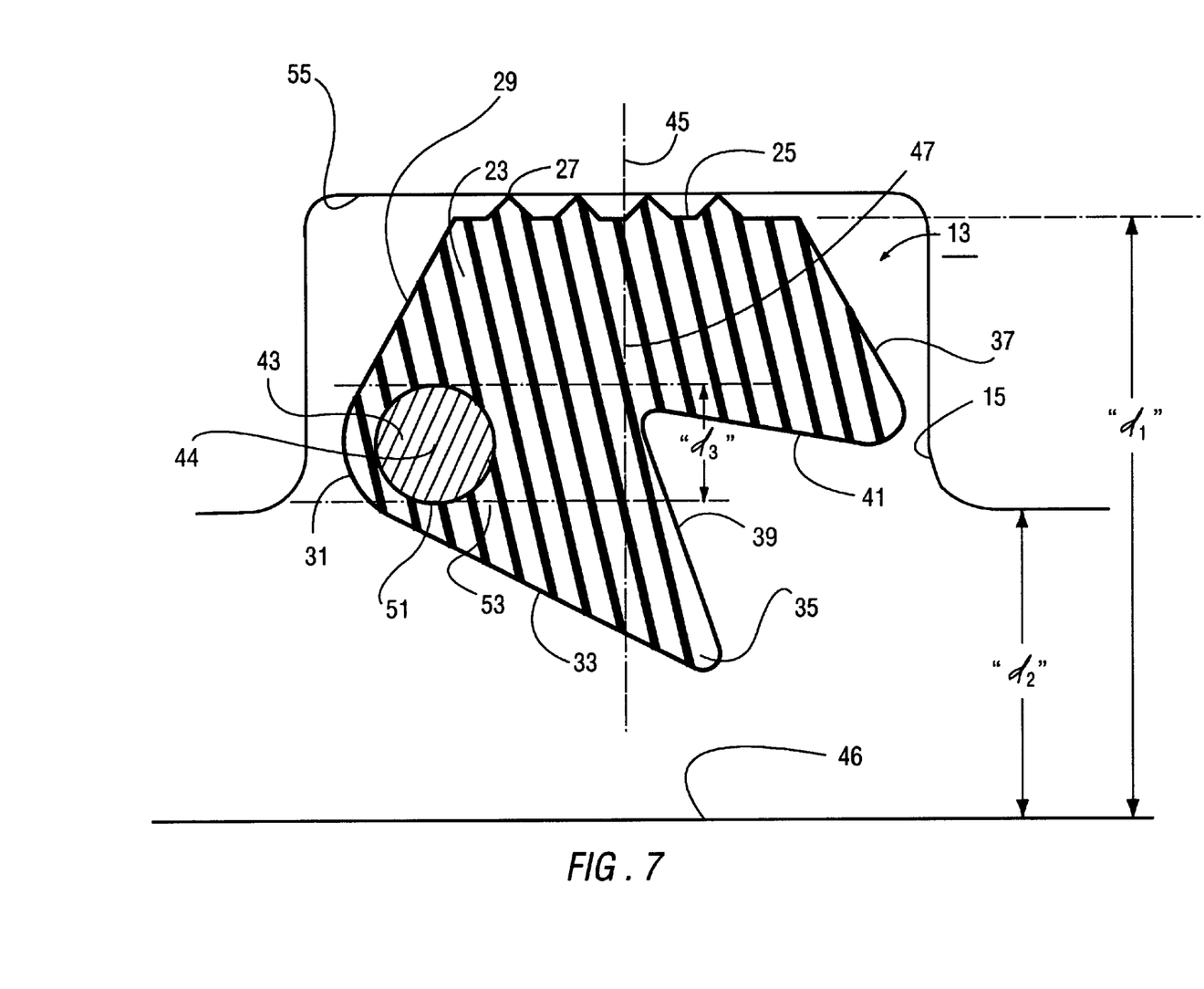
FIG. 7 is an isolated, cross-sectional view of the gasket of the invention, showing the embedded relatively rigid ring therein.

The gasket 13 which is used in the method of the invention is shown in cross-section in FIG. 7. Preferably, the gasket 13 is an annular, ring-shaped member formed of a flexible elastomeric material, such as a suitable rubber. As will be apparent from FIG. 7, the gasket 13 has an external diameter "$d_1$" which is greater than the internal diameter "$d_2$" of the mouth opening of the bell end of the pipe. The elastomeric material used to form the body 23 will vary in composition depending upon the end application but may include natural and synthetic rubbers including, for example, SBR, EPDM, NBR, nitrile rubber, etc. In the embodiment of the gasket shown in FIG. 7, the gasket includes an inner sealing surface 25 which, in this case, is provided with a series of ribs or serrations 27. The gasket includes a leading face 29 which joins a convex nose region 31 which continues on to form a primary sealing surface 33. In this case, the primary sealing surface 33 is an evenly sloping, outer face of the body 23 which forms a lip region 35 thereof. The lip region is separated from a trailing face 37 of the gasket body by means of convex regions 39, 41 which allows the lip region 35 to "flap" inwardly as the mating male, spigot end of a mating pipe section encounters the primary sealing surface 33 of the gasket and pushes the lip region 35 in the direction of the surface 41.

The gasket body 23 also has a relatively rigid ring 43 embedded therein having a midpoint 44. The relatively rigid ring 43 can be made of a variety of relatively rigid materials but is preferably made of steel. The relatively rigid ring is generally round in cross-section, as shown in FIG. 7, and circumscribes the annular body 23 of the gasket 13 at one embedded, circumferential location.

The positioning of the relatively rigid ring within the gasket body is critical to the method of the invention. The axis 45 in FIG. 7 passes through the approximate mid-point 47 of the gasket body 13. The relatively rigid ring 43 is located in front of the vertical axis 45 as viewed along the longitudinal axis of the pipe 46 in a location adjacent the convex nose region 31. The relatively rigid ring 43 also has a cross-sectional diameter ("$d_3$" in FIG. 7) and an internal diameter which defines a locus of points (e.g., point 51) which is equal to or greater than the internal diameter ("$d_2$" in FIG. 7) of the bell end 17 of the pipe which joins the annular groove 15.

In other words, if a point 51 on the inner surface of the ring 43 is one point in the locus of points, an imaginary line 53 drawn tangent to the point 51 is approximately at the internal diameter "$d_2$" of the pipe or is located further inward in the direction of the bottom surface 55 of the groove 15.

The relatively rigid ring 43 of the annular gasket tends to resist axial forces tending to displace the gasket from the annular groove 15 when in position within the groove. To position the ring 43 at a location within the gasket body 23 so that it resides partly or wholly within the groove 15 is unexpected since the ring diameter then exceeds the normal pipe diameter "$d_2$". The method of the invention provides a convenient mechanism for installing the gasket within the preformed pipe groove, even with a relatively rigid ring whose ultimate internal diameter equals or exceeds the internal diameter of the remainder of the pipe.

Returning to FIG. 1, the apparatus used in the method of the invention includes a work station which includes an arcuate rest 55 for receiving the bell end of the pipe section 19. A hydraulically actuated clamp 57 can be moved in vertical fashion to engage the bell end 17 on the arcuate rest 55. A hydraulic cylinder 59 having an output shaft 60 is used to move the clamped pipe axially along the horizontal work axis 61. The cylinder 59 is affixed to a work platform 63. In this way, the bell end 17 can be positioned in the work station so that the pipe section is oriented along the horizontal work axis 61.

The apparatus also includes an insertion station 65 which includes an insertion tool 67 mounted on a platform 69 by means of a hydraulic cylinder 71 having an output shaft 73 which is affixed to a support bracket 75, the support bracket being used to support the insertion tool 67 with its associated loader plate 77. The loader plate 77 is a generally planar member inclined at an oblique angle to the horizontal work axis 61 and has an eliptically shaped peripheral edge 79 for engaging the internal diameter of the gasket. The peripheral edge 79 thus forms a gasket retaining surface for the insertion tool. The peripheral edge 79 is broken at one point 81 so that a section is missing from the plane of the surface 78, thereby creating an opening for the retaining bar 82 which is shown engaging the gasket in FIG. 1. Actuation of the shaft 73 of the cylinder 71 moves the loader plate 77 and its associated gasket toward and away from the mouth opening 21 of the pipe bell end, generally along the horizontal work axis 61.

The insertion station 65 also includes a retracting tool 83 which is mounted on the output shaft 85 of a hydraulic cylinder 87. As viewed in FIG. 1, the shaft 85 is oriented approximately 180° out of phase with the output shaft 73 of the insertion tool. The retraction tool 83 is mounted within a cylindrical shield 89 and includes a hinge member 91 which is free to move in arcuate fashion about a pivot point 93.

As shown in FIG. 1, the platform 69 which is used to support the insertion tool 67 and retracting tool 83 is rotatable about a vertical axis 95 by means of a suitable planetary gear arrangement 97 and a suitable power source, for example an electric or hydraulic motor. In this way, the gear system 97 can be actuated to rotate the platform 69 so that the retracting tool 83 is rotated 180° into alignment with the mouth opening 21 of the pipe section 19, as will be more fully described hereafter.

Figure 2:
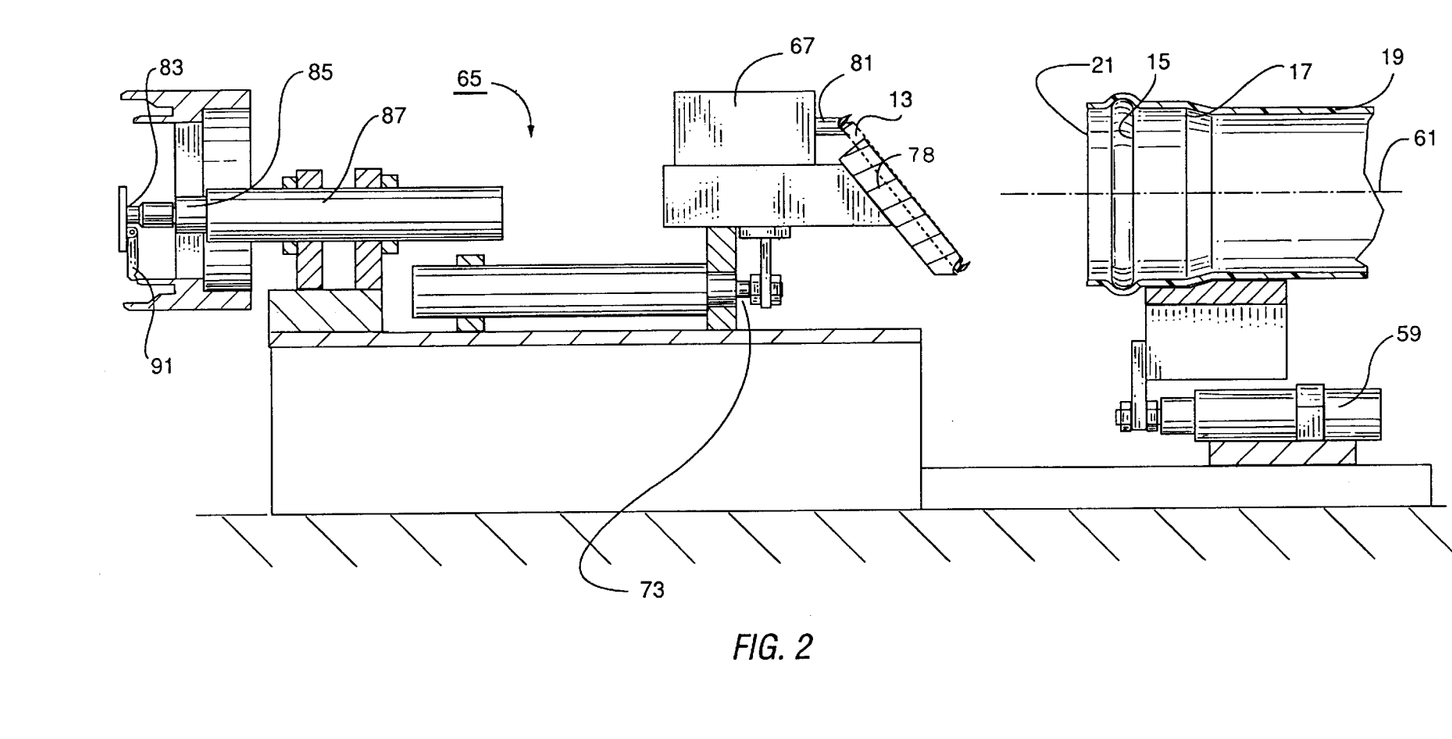
FIG. 2 is a simplified, side operational view of the apparatus of FIG. 1 showing the gasket in place on an insertion guide and showing the preformed annular groove in the bell end of the pipe section the pipe being shown in cross-section.
Figure 3:
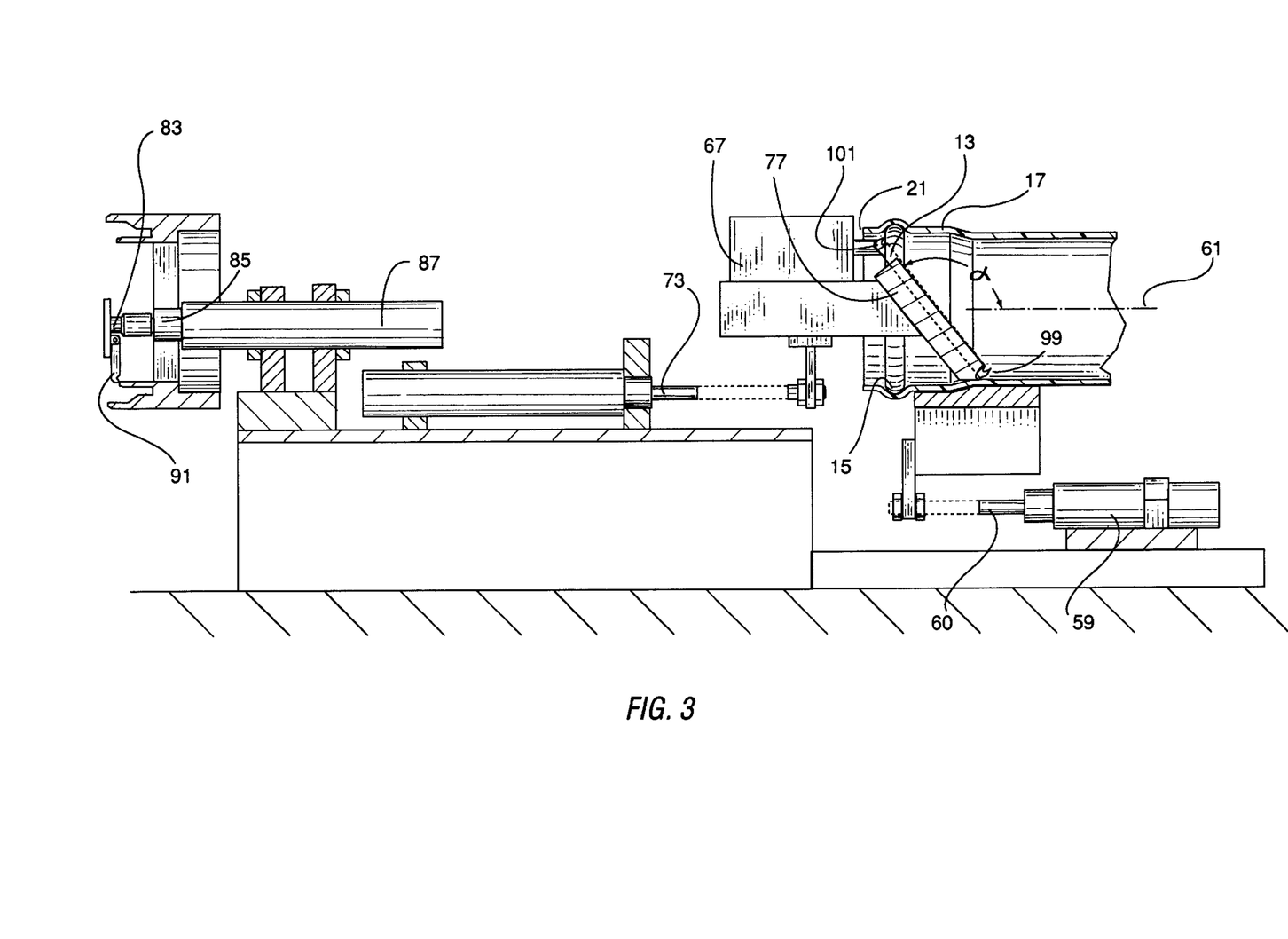
FIG. 3 shows the first step in the installation method of the invention in which the insertion guide is moved axially along a horizontal work axis of the bell pipe end.

FIGS. 2–6 illustrate, in simplified schematic fashion, the operation of the method of the invention. FIG. 2 shows the insertion station 65 in the start position with a gasket 13 of the invention in place on the loader plate 77 of the insertion tool 67. The bell end 17 of the pipe section 19 is also positioned in the work station so that the pipe section 19 is oriented along the horizontal work axis 61. FIG. 3 shows the beginning of the installation operation in which the cylinder shafts 60 and 73 are extended whereby the insertion tool 67 and pipe bell end 17 are moved together along the horizontal work axis 61. As the loader plate 77 and gasket 13 move within the mouth opening 21, the annular gasket 13 has a generally eliptical shape and is oriented at an oblique angle indicated generally as "α" in FIG. 3. The angle "α" is approximately 160° in counterclockwise rotation from the axis 61 in FIG. 3. It will be understood, however, that the oblique angle could be acute, as well, with respect to the axis 61 by rearranging the tooling. In this way, a leading edge 99 of the annular gasket moves past the annular groove 15 provided in the bell end 17 and a trailing edge 101 of the gasket 13 begins to move into position to engage the annular groove 15.

Figure 4:
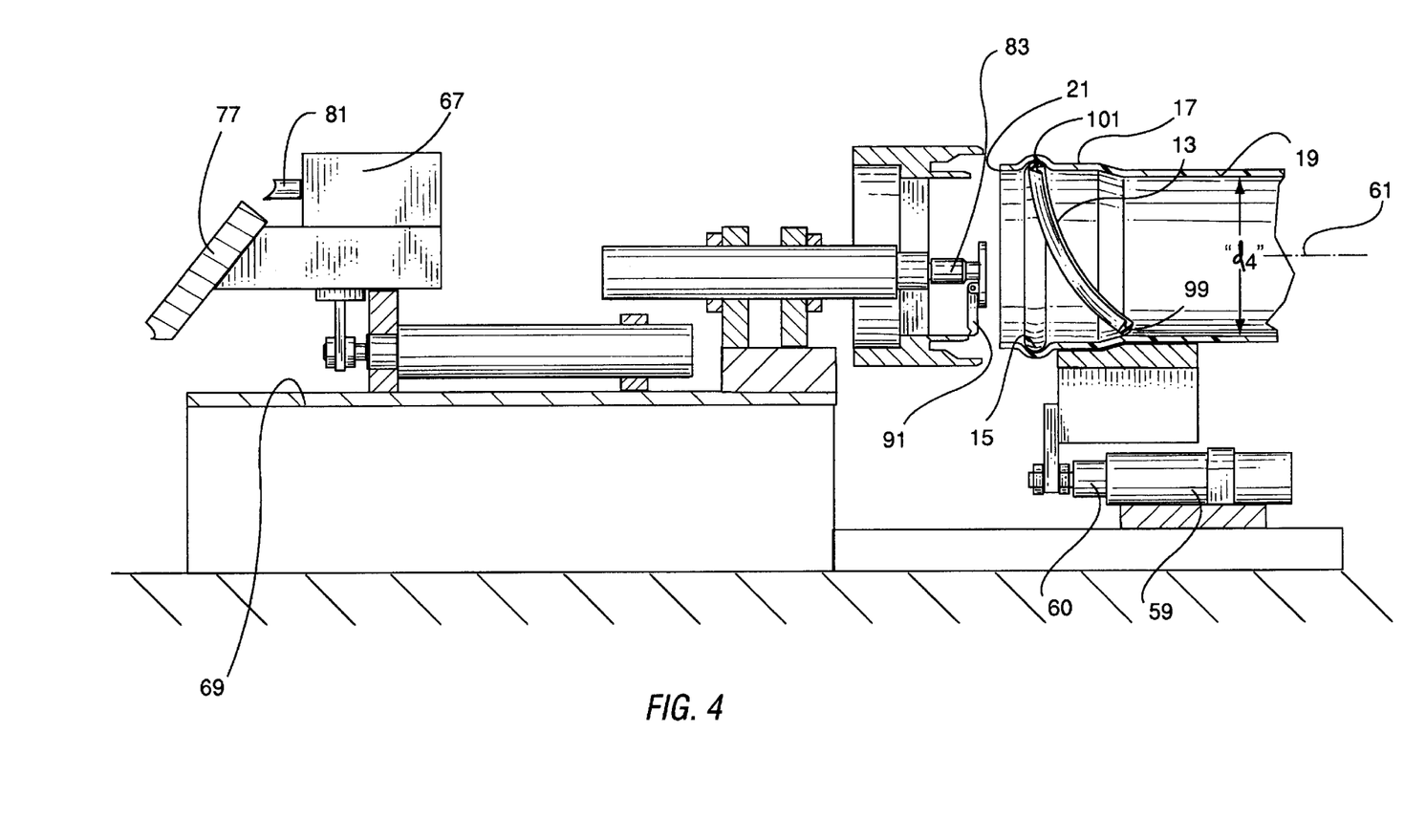
FIG. 4 is a view similar to FIG. 3 but showing the insertion guide removed and rotated so that a retraction tool is ready to enter the bell pipe end.

FIG. 4 shows the next step in the installation procedure in which the gasket 13 has the trailing portion 101 engaging the circumferential groove 15 in the pipe bell end 17. The leading edge 99 is received within the internal pipe diameter "$d_4$." The gasket is also flexed somewhat so that the gasket body and internal relatively rigid ring are flexed to the position shown in FIG. 4. The platform 69 has also been rotated 180° by means of the gear system shown in FIG. 1 so that the retracting tool 83 is now aligned with the horizontal work axis 61 and so that the tool is facing the mouth opening 21 of the pipe section 19. The output shaft 60 from the cylinder 59 has been fully retracted to the rest position.

Figure 5:
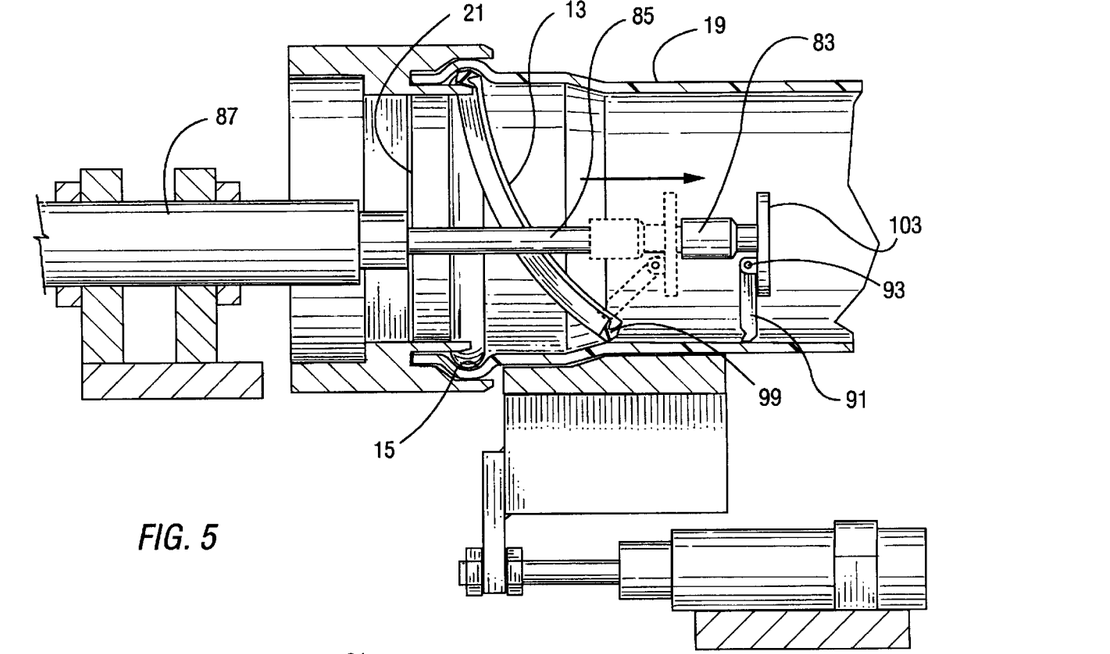
FIG. 5 shows the next step in the installation method in which the retraction tool is extended and then begins the retraction process, thereby engaging the leading edge of the gasket.
Figure 6:
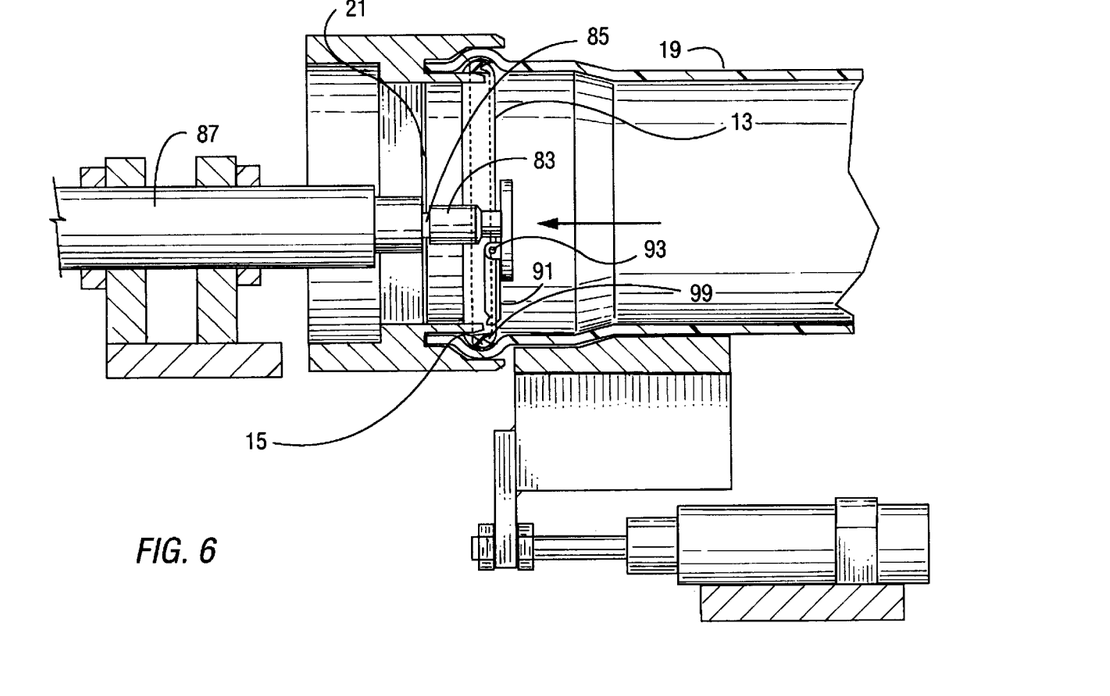
FIG. 6 is a view similar to FIG. 5 but showing the further movement of the retraction tool, causing the gasket to be received in snap-fit fashion within the annular groove in the bell end of the pipe.

As shown in FIGS. 5 and 6, the retracting tool 83 is extended by means of the shaft 85 of the hydraulic cylinder 87 so that the tool end 103 passes within the mouth opening 21 of the pipe 19. Because the hinge member 91 can pivot about the point 93, it moves between the two positions indicated in FIG. 5 from the dotted position to the extended position (shown in solid lines) as the tool end 103 clears the gasket 13. The shaft 85 of the cylinder 87 is then retracted, as shown in FIG. 6. As the gasket is retracted, the hinge member 91 is retained by the planar tool end 103 so that it exerts a retracting force on the annular gasket 13 by pulling the leading edge 99 thereof backwards in the direction of the mouth opening 21 of the bell end until the gasket snaps into a locked-in position (FIG. 6) within the annular groove 15. Once in the locked-in position shown in FIG. 6, the gasket again assumes a generally cylindrical shape. Once the gasket 13 is seated within the groove 15, the length of the hinge member 91 is such that it clears the internal diameter of the gasket and the pipe internal diameter so that the retracting tool can be returned to the position shown in FIG. 4.

During the retraction operation, a new gasket is installed upon the gasket receiving surface 78 of the insertion tool 67. The platform 69 is then be rotated 180° from the position shown in FIGS. 4–6 to the position shown in FIG. 2 and the operation is repeated for a new pipe section.

An invention has been provided with several advantages. The method for installing a gasket of the invention allows a pipe gasket to be installed within a preexisting and preformed groove in a thermoplastic pipe. Once the gasket has been locked into position in snap-fit fashion, it is securely retained within the pipe groove and resists axial forces tending to displace the gasket from the annular groove. Because a gasket is inserted within a preformed pipe groove, the manufacturing and installation processes are simplified and made less costly. The gasket which is utilized in the process is simple in design and economical to manufacture and does not require exotic materials or multiple components. There is no need for an external retaining band to assist in securing the gasket within the pipe groove. The gasket of the invention is retained so securely within the pipe groove that it would generally be necessary to destroy the pipe material to remove the gasket once the gasket is in locked-in position.

While the invention has been shown in only one of its forms, it is not thus limited but is susceptible to various changes and modifications without departing from the spirit thereof.

What is claimed is:

1. A method for installing a gasket within a gasket receiving groove provided within the bell end of a pipe section, the bell end having a mouth opening which is engageable with a spigot end of a mating pipe section to form a pipe joint, the method comprising the steps of:

providing a pipe section having a bell end opening;

orienting the pipe section having the bell end along a horizontal work axis;

mounting an annular gasket formed at least in part of a flexible material on an elliptically shaped loader plate, the gasket being temporarily transformed from a generally cylindrical shape to a generally elliptical shape;

inserting the gasket within the mouth opening of the bell end, the annular gasket being oriented at an oblique angle with respect to the horizontal work axis such that a trailing edge of the gasket engages the annular groove, and a leading edge of the annular gasket is moved past the annular groove provided in the bell end;

exerting a retracting force on the annular gasket by pulling the leading edge thereof backwards in the direction of the mouth opening of the bell end until the gasket again assumes a generally cylindrical shape and snaps into a locked-in position within the annular groove.

2. The method of claim 1, wherein the pipe sections are formed of synthetic plastic materials.

3. The method of claim 2, wherein the pipe sections are formed of a synthetic plastic material selected from the group consisting of polypropylene, polyethylene and polyvinyl chloride.

4. The method of claim 2, wherein the annular gasket is inserted within the mouth opening of the bell end of the pipe section at an angle less than 90 degrees with respect to the horizontal working axis of the bell end.

5. The method of claim 1, wherein the annular gasket is inserted within the mouth opening of the bell end of the pipe section at an angle greater than 90 degrees with respect to the horizontal working axis of the bell end.

6. The method of claim 1, wherein the annular gasket has a body formed of a flexible elastomeric material and wherein a relatively rigid ring is located at an embedded location which circumscribes the gasket body, the relatively rigid ring being generally round in cross-section.

7. The method of claim 6, wherein the relatively rigid ring is made of metal.

8. The method of claim 7, wherein the relatively rigid ring is made of steel.

9. The method of claim 6, wherein the relatively rigid ring has a cross-sectional diameter which defines a locus of points on an inner surface thereof which is equal to or greater than the internal diameter of the remainder of the bell end of the pipe which joins the annular groove.

10. A method for installing a gasket within a gasket receiving groove provided within the bell end of a pipe section, the bell end having a mouth opening which is engageable with a spigot end of a mating pipe section to form a pipe joint, the method comprising the steps of:

providing a pipe section having a bell end opening;

positioning the pipe section having the bell end in a work station so that the pipe section is oriented along a horizontal work axis;

mounting an annular gasket formed at least in part of a flexible material on an insertion tool, the insertion tool having retaining surface for receiving the gasket, the insertion tool being movable axially along the horizontal work axis into and out of the mouth opening of the bell end, the insertion tool also being rotatable about a vertical axis with respect to the horizontal work axis;

inserting the annular gasket within the mouth opening of the bell end by moving the gasket retaining surface axially along the horizontal work axis, the annular gasket being oriented on the gasket retaining surface at an oblique angle with respect to the horizontal work axis, whereby a leading edge of the annular gasket moves past the annular groove provided in the bell end;

moving the insertion tool in an opposite direction along the horizontal work axis to retract the insertion tool, the annular gasket being left behind within the mouth opening by frictional resistance with the pipe interior;

rotating the insertion tool about its vertical axis to thereby align a retracting tool with the horizontal work axis;

using the retracting tool to exert a retracting force on the annular gasket by pulling the leading edge thereof backwards in the direction of the mouth opening of the bell end until the gasket snaps into a locked-in position within the annular groove; and removing the retracting tool from the mouth opening of the bell pipe section.

11. The method of claim 10, wherein the pipe sections are formed of synthetic plastic materials.

12. The method of claim 11, wherein the pipe sections are formed of a synthetic plastic material selected from the group consisting of polypropylene, polyethylene and polyvinyl chloride.

13. The method of claim 10, wherein the annular gasket is inserted within the mouth opening of the bell end of the pipe section at an angle less than 90 degrees with respect to the horizontal working axis of the bell end.

14. The method of claim 11, wherein the annular gasket is inserted within the mouth opening of the bell end of the pipe section at an angle greater than 90 degrees with respect to the horizontal working axis of the bell end.

15. The method of claim 10, wherein the annular gasket has a body formed of a flexible elastomeric material and wherein a relatively rigid ring is located at an embedded location which circumscribes the gasket body, the relatively rigid ring being generally round in cross-section.

16. The method of claim 15, wherein the relatively rigid ring is made of metal.

17. The method of claim 15, wherein the relatively rigid ring is made of steel.

18. The method of claim 16, wherein the relatively rigid ring has a cross-sectional diameter which defines a locus of points on an inner surface thereof which is equal to or greater than the internal diameter of the bell end of the pipe which joins the annular groove.

19. The method of claim 15, wherein the relatively rigid ring of the annular gasket tends to resist axial forces tending to displace the gasket from the annular groove when in position within the groove.

* * * * *